Fig. 1.

Feb. 8, 1966 M. L. ANTHONY 3,233,321
AUTOMATIC TOOL CHANGING APPARATUS
Filed April 22, 1963 7 Sheets-Sheet 5

INVENTOR.
Myron L. Anthony

Feb. 8, 1966 M. L. ANTHONY 3,233,321
AUTOMATIC TOOL CHANGING APPARATUS
Filed April 22, 1963 7 Sheets-Sheet 6

INVENTOR.
Myron L. Anthony
BY
Brown, Jackson, Boettcher & Dienner
Attys.

United States Patent Office 3,233,321
Patented Feb. 8, 1966

3,233,321
AUTOMATIC TOOL CHANGING APPARATUS
Myron L. Anthony, La Grange, Ill., assignor to Scully-Anthony Corporation, La Grange, Ill., a corporation of Illinois
Filed Apr. 22, 1963, Ser. No. 274,414
27 Claims. (Cl. 29—568)

The present invention relates to automatic tool changing apparatus adapted to be employed in conjunction with a machine tool to automatically transfer a plurality of tools seriatim from a storage area to a spindle or work station and subsequetly back again to the storage area, such apparatus being especially suited for use in conjunction with data controlled machine tools.

Various types of automatic tool changing apparatus have heretofore been proposed, and the present invention relates to an improved tool changing system which in certain applications offers significant advantages over the systems previously known.

In the co-pending application of Myron L. Anthony and Bernard R. Better, entitled Apparatus and Method for Automatic Tool Changing, Serial No. 178,060, filed March 7, 1962, there is described a tool holder having a generally radial flange formed thereon, and there is also described tool gripping means adapted to engage a gripping surface on such a flange through gripping movement in a direction generally parallel to the axis of the tool holder, whereby the holder and a tool mounted therein may be transferred from one position to another. The present tool changing system is not limited to use with flanged tool holders of the type mentioned, but it is particularly well adapted for use with such tool holders and will be described in detail hereinafter in conjunction with flanged tool holders. Accordingly, certain of the tool transfer components described herein are provided with gripping means adapted to grip a radial flange on a tool holder through gripping motions parallel to the axis of the holder, as is more fully described in the above-mentioned co-pending application. In this connection, it should be understood that the terms "tool" and "tool holder" are used interchangeably herein and in the appended claims, since a radial flange having a gripping surface thereon may readily be formed either on a tool holder or directly on a tool.

In still another co-pending application which I filed jointly with Bernard R. Better, entitled Automatic Tool Changing Apparatus, Serial No. 265,552, filed March 15, 1963, there is described a tool changing system including a transfer arm which is rotatable and axially movable and which is provided with flange gripping means at each of its ends. In the latter system, the transfer arm is adapted to grip at the same time a newly selected tool which has been removed from a tool storage member and is being held at a transfer station, and an old tool which is held in a machine tool spindle, one tool being gripped at each end of the arm. The transfer arm is then moved axially forwardly to remove the old tool from the spindle, after which the arm is rotated 180 degrees and returned to its original axial position so as to insert the newly selected tool in the spindle and place the old tool at the transfer station where it can be gripped by other tool transfer means such as a shuttle or the like and returned to storage. It will thus be understood that in the tool changing system described in the above-mentioned co-pending application, the exchanging operation, that is, the interchanging of the positions of the old tool and the new tool, is performed in effect at the spindle by the transfer arm during its rotational movement as described above.

The present invention relates to a new concept in tool changing whereby tool transfer means having tool holding means thereon adapted to hold only one tool at a time is utilized to transport an old tool which has been removed from a machine tool spindle to an interchange position which is radially spaced from the spindle axis. An exchanger member is positioned at the interchange position, and the exchanger is provided with a pair of tool holding means so as to be adapted to support in one of its tool holding means a newly selected tool which has been removed from a tool storage member, and also to receive in the other of its holding means the old tool from the tool transfer means. The exchanger is a rotatable member and by rotating it through an angle of 180 degrees the old tool is moved away from the holding means on the tool transfer means and a new tool is delivered thereto, whereby the newly selected tool may be transported to the spindle.

In one embodiment to be described herein, the tool transfer means is itself axially movable so as to be adapted to remove the old tool from the spindle and insert the new tool therein, whereas in accordance with an alternative embodiment to be described, the actual insertion of a tool in the spindle and the removal of a tool there from is effected by a separate axial tool transport means. However, in either case, an old tool is removed from the spindle and transported to an interchange position radially spaced from the spindle axis, where the tool is temporarily held by the tool transfer means, and an exchanger is disposed at the interchange position to receive the old tool and present a new tool to the tool transfer means, whereby the latter is then adapted to transfer the new tool either directly to the spindle, or in accordance with the alternative embodiment to a position forward of and axially aligned with the spindle where axial transport means will take the tool and insert it in the spindle.

There are numerous important advantages offered by the tool changing apparatus of the present invention, particularly when used in conjunction with data controlled machine tools, and these will appear more fully as the description proceeds. However, it may be noted at this time that one of the most serious problems which is presented in designing automatic tool changing apparatus is the problem of space at the front of the machine tool, that is, the problem of locating the tool changing components so that they will not interfere with the operation of the machine tool. Accordingly, by providing at the front of the machine, tool transfer means which need carry only one tool at a time, such transfer means can be made to occupy substantially less space during its operating cycle, and can be more readily retracted out of the way when inoperative, and the actual exchanging of the old tool and the new tool can be carried out by an exchanger which is located radially away from the spindle at an interchange position where the problem of space and of avoiding interference with the operation of the machine tool is less critical.

It is therefore an object of the present invention to provide improved automatic tool changing apparatus which will occupy relatively little space at the front of a machine tool whether such apparatus is standing idle in a neutral position or is carrying out a tool changing operation.

Another more specific object of the invention is to provide tool changing apparatus including tool transfer means for carrying an old tool which has been removed fiom a machine tool spindle to an interchange position radially spaced from the spindle axis, and an exchanger member at the latter position to receive the old tool and present a newly selected tool to the tool transfer means for delivery to the spindle.

A further object is to provide automatic tool changing apparatus including axial tool transport means supported to move axially to insert and withdraw a tool from a machine tool spindle, in combination with tool transfer means supported to move in a plane perpendicular to the spindle axis toward and away from said spindle and adapted to deliver a tool to said axial transport means and to receive a tool therefrom.

Other objects, uses and advantages of the invention will become apparent, or be obvious, from the following specification, particularly when considered in conjunction with the accompanying drawings in which.

Figure 1:
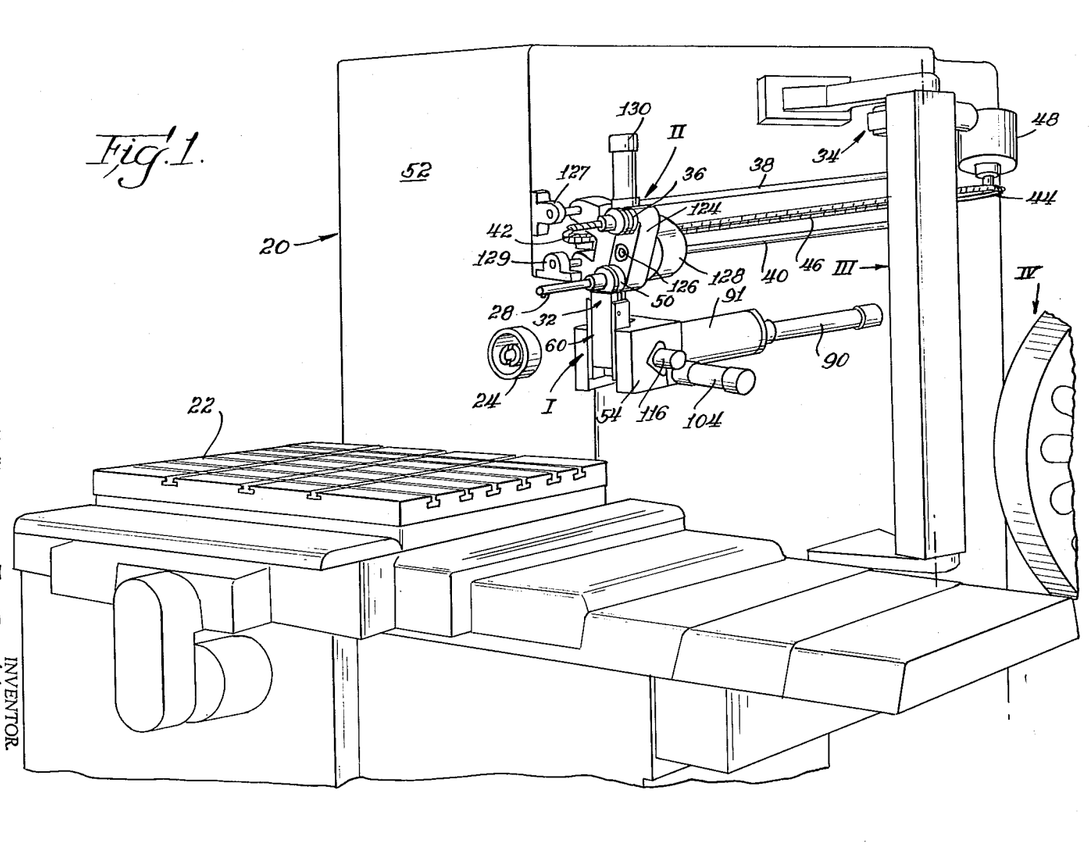
FIGURE 1 is a perspective view, partly broken away, of a machine tool equipped with automatic tool changing apparatus constructed in accordance with the present invention.

Referring now to the drawings, FIGURE 1 shows a machine tool 20 having a work table 22 and a spindle 24. Associated with the machine tool are a number of automatic tool changing components including tool transfer means I, a combined rotatable exchanger and horizontal shuttle II, a vertical shuttle III, and a tool storage matrix IV. The present invention is largely concerned with the tool transfer means I and the exchanger II, both of which will be described fully herein, whereas the shuttle III and the matrix IV are shown here primarily for the purpose of illustrating a complete system, and the latter components are described more fully in a co-pending application which will be identified hereinbelow.

Figure 3:
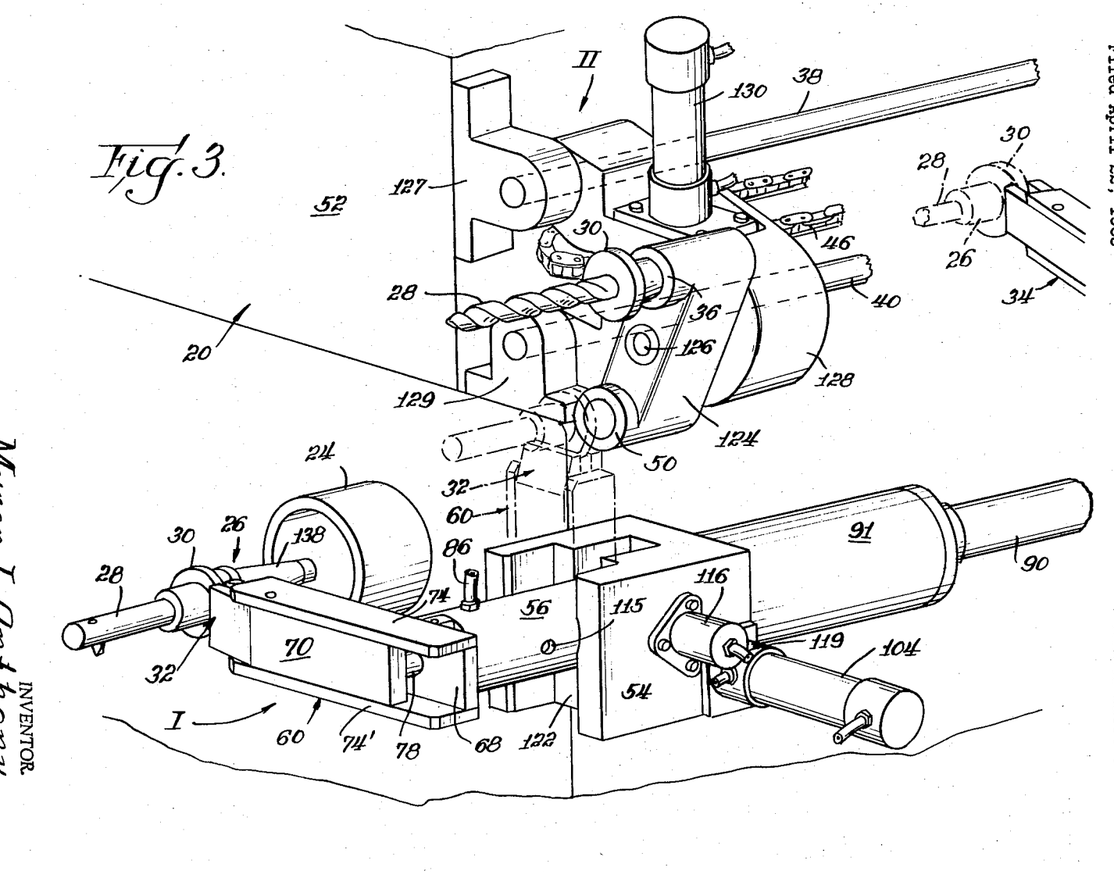
FIGURE 3 is a substantially enlarged fragmentary perspective view showing in greater detail certain of the major components of the tool changing apparatus of FIGURE 1.

Before describing in detail the various components of the tool changing apparatus of the present invention, I will describe briefly the manner in which such components cooperate with one another to effect a tool changing operation. Reference is made to FIGURES 1 and 3, and there is shown in FIGURE 3 a tool holder 26 which has a tool 28 mounted therein. The tool holder 26 is provided with a generally radial flange 30, and the tool transfer means I is provided with tool gripping means 32 comprising a pair of jaws adapted to move in a direction parallel to the axis of the tool for gripping therebetween the flange portion 30 (see also FIGURE 5). As noted earlier herein, flanged tool holders and gripping means therefore are described more fully in co-pending application Serial No. 178,060.

Figure 2:
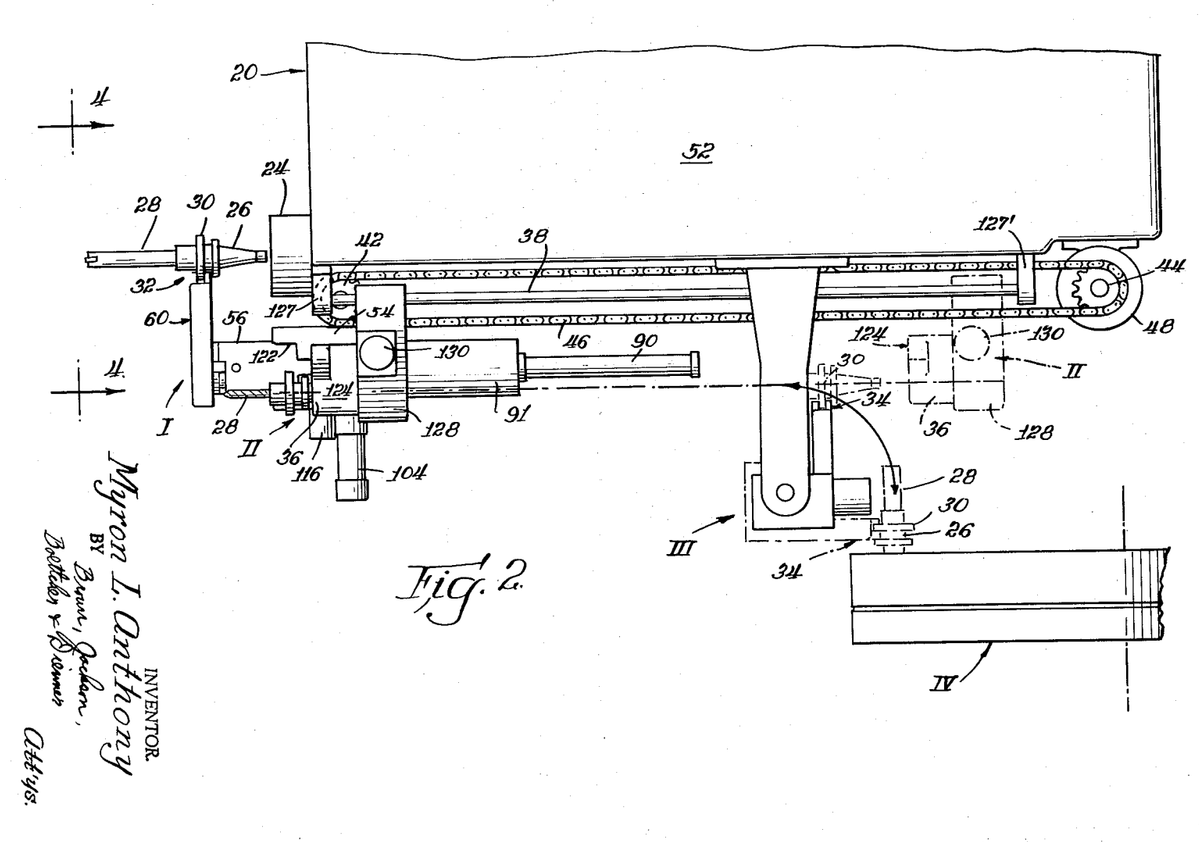
FIGURE 2 is an enlarged fragmentary top plan view of the apparatus of FIGURE 1.

While a tool 28 is positioned in the spindle 24 and is engaged in a machining operation, the tool storage matrix IV may be rotated to position a selected tool at a transfer station where it can be taken out of the matrix by flange gripping jaws 34 on the vertical shuttle III and moved upwardly to a second transfer station where it can be delivered to the horizontal shuttle II. FIGURE 2 shows the manner in which the entire vertical shuttle III may be made rotatable about a vertical axis to permit the shuttle gripper 34 to be aligned with a flange portion 30 on a selected tool holder 26 so that the gripper may be moved over the flange portion and closed thereon. The shuttle III is then rotated back to the position shown in solid lines in FIGURE 2 and the shuttle is operated to raise the selected tool to a second transfer station wherein it is in alignment with a socket or pot 36 on the exchanger II. The second transfer station of the tool 28 is shown in dash lines in the right hand portion of FIGURE 3, but it must be understood that at this time the exchanger II will be positioned at the rear end of its horizontal path as shown in dash lines in FIGURE 2 so that it can subsequently be moved forwardly to seat the tool holder 26 in the socket 36. For a more complete description of the vertical shuttle III, the matrix IV, and the manner of transferring a selected tool from the matrix to the vertical shuttle and then to a horizontal shuttle, reference is made to my co-pending application entitled Automatic Tool Handling Apparatus, Serial No. 224,058, filed September 17, 1962, now Patent No. 3,161,951.

It is preferable that the newly selected tool 28 not be transferred to the combined exchanger and horizontal shuttle II while the spindle 24 is operating, since the exchanger is mounted on the head of the machine tool 20 and operation of the exchanger may produce some undesirable deflection or disturbance at the spindle. However, as soon as a machining operation has been completed and the spindle 24 has stopped, the exchanger II may be moved forwardly from the rearward position shown in dash lines in FIGURE 2 to seat the newly selected tool in the socket 36. The flange gripping jaws 34 on the vertical shuttle III are then opened and moved upwardly out of the path of the exchanger II, after which the exchanger may be moved further forwardly to the interchange position as shown in FIGURES 1–3.

The exchanger II is mounted on a pair of horizontal guide rods 38 and 40 so as to be slidable forwardly and rearwardly thereon, and the exchanger is moved along the horizontal rods by means of a chain drive comprising a pair of sprocket wheels 42 and 44, an endless chain 46 which is connected to the exchanger, and a drive motor 48.

One of the functions of the tool transfer means I in the embodiment being described is to remove the old tool from the spindle 24 and insert it in a second pot or socket 50 in the exchanger II. In order to shorten the time required for a tool changing operation, the foregoing operation of the tool transfer means may begin approximately at the time the spindle 24 is stopped. At the beginning of such a cycle the tool transfer means I will normally be disposed in a neutral retracted position as shown in FIGURE 1, and while the exchanger II is operating to take a newly selected tool from the vertical shuttle III and bring it forwardly, the tool transfer means may be engaged in removing an old tool from the spindle 24.

Figures 5, 6:
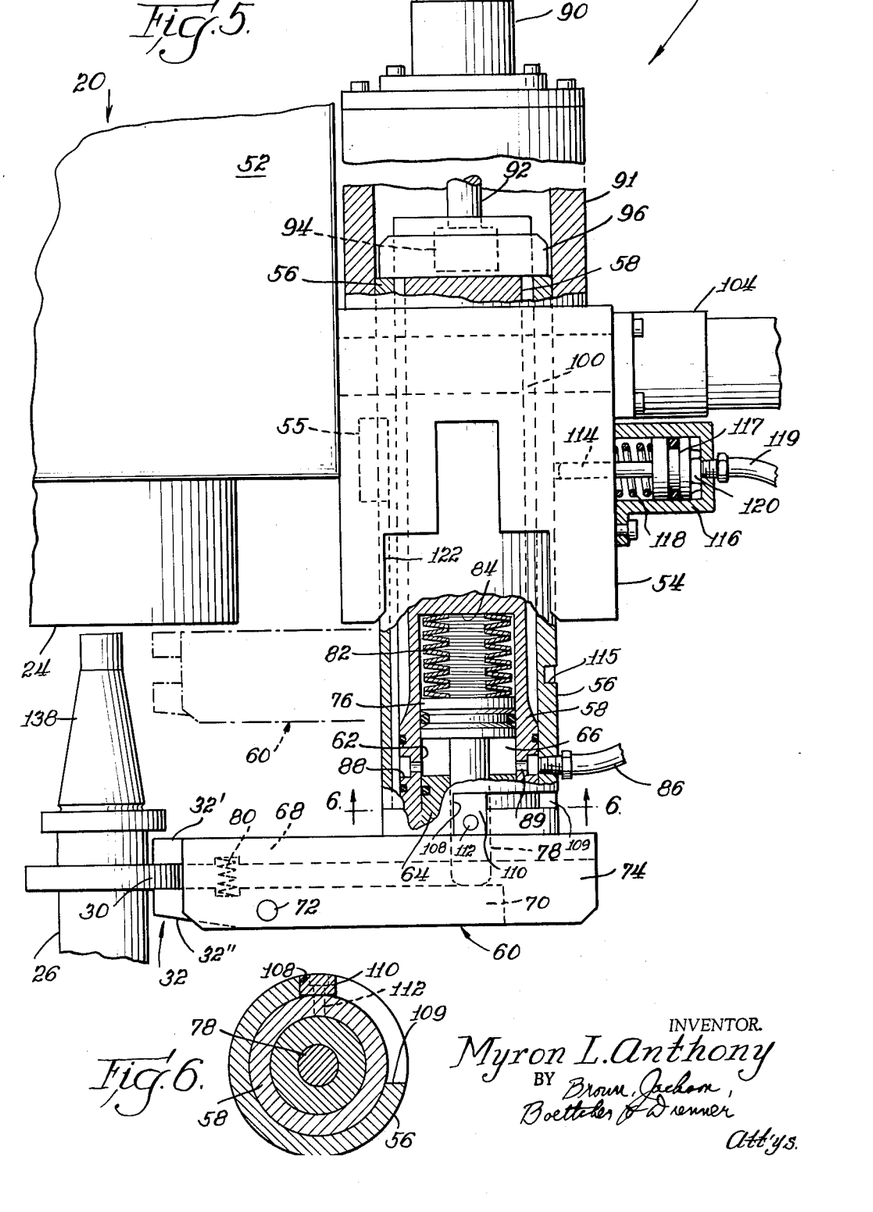
FIGURE 5 is a fragmentary view, partly in section and partly in top plan, taken substantially along the line 5—5 of FIGURE 4.
FIGURE 6 is a transverse section taken substantially along the line 6—6 of FIGURE 5.

Thus, with the transfer means I in the position shown in FIGURE 1, wherein it is in its extreme rearward or retracted axial position and its upper or vertical rotational position, it is moved forwardly to an intermediate axial position and then rotated 90 degrees in a counterclockwise direction to a generally horizontal position wherein the gripper 32 encompasses a portion of the flange 30 on the tool in the spindle. The gripper 32 is then closed and the transfer means I is moved axially forwardly to its extreme forward position to withdraw the old tool from the spindle 24, as shown in FIGURES 2, 3 and 5. The tool transfer means I is then rotated 90 degrees in a clockwise direction (as viewed in FIGURE 3) so as to be returned to its generally vertical position, after which it is moved axially rearwardly to its extreme rearward position in order to insert the old tool in the empty socket 50 in the exchanger II. It will be understood that movements of the exchanger II and the tool transfer means I must be timed relative to one another so that the exchanger is in the interchange position as shown in FIGURES 1–3 and thus ready to accept the old tool by the time the transfer means I arrives with the old tool, although these two members may arrive at the interchange position at approximately the same time.

Once the old tool has been deposited in the socket 50 of the exchanger II, the gripping jaws 32 on the transfer means I are opened, and the exchanger is rotated 180 degrees so as to place the newly selected tool in a position wherein a portion of the flange 30 thereon is encompassed by the gripipng jaws 32. The jaws 32 are then closed to grip the newly selected tool, and the transfer means I is moved to its extreme forward axial position and then rotated 90 degrees in a counterclockwise direction so as to align the new tool with the spindle 24 as shown in FIGURES 2 and 3, after which the transfer means I is moved rearwardly to its intermediate axial position to insert the new tool in the spindle 24, and the tool is then locked in the spindle by chucking mechanism (not shown). The gripper jaws 32 are then opened and the tool transfer means is again rotated approximately 90 degrees in the clockwise direction to its generally vertical position and then moved rearwardly to its extreme rearward or retracted position as shown in FIGURE 1. The latter position may comprise a neutral position in which the transfer means I may remain until the next tool changing cycle.

It will be understood that while the transfer means I is delivering the newly selected tool to the spindle 24, the combined exchanger and horizontal shuttle II may be moved rearwardly through operation of the shuttle drive motor 48 to deliver the old tool to the vertical shuttle III for return to the storage matrix IV. The return of the old tool is effected by moving the exchanger-shuttle II rearwardly to a transfer station where the flange 30 on the old tool is in alignment with the gripper jaws 34 on the vertical shuttle III. The vertical shuttle III is then moved downwardly so that the open jaws 34 encompass a portion of the flange 30 on the old tool and the jaws are closed, after which the exchanger-shuttle II is moved to its extreme rearward position as shown in dash lines in FIGURE 2 so as to clear the tool, and the vertical shuttle is moved downwardly and then rotated in order to return the old tool to an empty socket in the storage matrix IV.

The tool transfer means I and mechanism for actuating the same will now be described, and for this purpose reference is made to FIGURES 4 and 5. There is shown a fragmentary portion of the head 52 of the machine tool, and a housing 54 is mounted at the side of the head by an suitable means. An outer cylinder 56 is mounted within the housing 54 (see FIGURE 5) and is keyed thereto as at 55 whereby the cylinder 56 is slidable axially within the housing but is held against rotation therein.

An inner shaft 58 is mounted within the outer cylinder 56 and is adapted to move axially with the cylinder and also to rotate relative to the cylinder, as will be explained more fully hereinafter. A rotatable tool change arm indicated generally at 60 is fixedly secured to the forward end of the inner shaft 58 so as to be adapted to move axially and rotate with the shaft. The shaft 58 has an axial bore 62 in the forward end thereof and an adapter or plug 64 is threaded into the end of the bore so as to provide a sealed chamber 66 within the inner shaft 58.

The tool change arm 60 includes an arm member 68 which is secured to the adapter 64 by a plurality of cap screws (not shown), and a movable arm member 70, the latter being pivotally mounted on a pin 72 which is supported in a pair of side wall members 74 and 74' which are secured to the arm 68. The radially outer ends of the arms 68 and 70 comprise gripper jaws 32' and 32" which constitute the gripper 32. It will thus be understood that when the arm member 70 is pivoted in a clockwise direction as shown in FIGURE 5, the jaw 32" will be moved toward the jaw 32' so as to be adapted to grip therebetween a portion of a flange 30 on a tool holder 26.

A piston 76 is disposed within the chamber 66 in the inner shaft 58 for axial sliding movement therein, and a rod 78 is secured to the piston and projects forwardly therefrom through an aperture in the arm member 68, whereby the end of the piston rod 78 is in engagement with the arm member 70. It will thus be understood that when the piston 76 is moved to its forward axial position the rod 78 will pivot the arm member 70 about the pin 72 in a clockwise direction so as to close the gripper 32, and when the piston is moved to its axially rearward position it will permit the gripper 32 to be opened by a compression spring 80 which is disposed between the arm members 68 and 70. Compression spring means such as a plurality of Belleville spring washers 82 are disposed in the chamber 66 between the base 84 of the bore 62 and the rearward side of the piston 76 so as to continuously urge the piston toward its forward axial position and thereby bias the gripper 32 toward its closed or operative gripping position.

The gripper 32 is adapted to be opened by introducing fluid under pressure into the chamber 66 on the forward side of the piston 76 so as to move the piston rearwardly against the force of the springs 82. The pressure inlet means comprises a pressure line 86 (the pressure line 86 is preferably disposed at the top of the outer cylinder 56 as shown in FIGURE 3, and the pressure line is shown in FIGURE 5 as projecting from the side of the cylinder 56 primarily for purposes of illustration) which extends through an opening in the outer cylinder 56 and communicates with a groove 88 which is formed around the circumference of the inner shaft 58. A plurality of radial apertures 89 are formed at the base of the groove 88 so as to communicate with the interior of the chamber 66. It will be understood that the groove 88 and radial apertures 89 will permit the hydraulic line 86 to communicate continuously with the chamber 66 even though the shaft 58 is adapted to rotate within the cylinder 56 during a tool changing operation.

A hydraulic actuating cylinder 90 is mounted at the rear end of a rear housing portion 91, and a piston rod 92 extends forwardly therefrom into the housing for connection with the rearward end of the inner shaft 58. The actuating rod 92 is connected to the shaft 58 by means of a swivel joint 94 which need not be described in detail except to point out that it may be comprised of a roller thrust bearing assembly or other known structure for axially securing the rod to the shaft 58 while permitting the shaft to rotate relative to the rod. A nut 96 is threaded on the rear end of the inner shaft 58 and is adapted to bear against the end of the outer cylinder 56 whereby when the shaft is moved axially forwardly by the actuator 90 the outer cylinder will be moved along with the shaft. Similarly, the arm member 68 of the tool change arm 60 is adapted to bear against the forward end of the outer cylinder 56 so that the outer cylinder will also be carried along with the shaft 58 when the latter is moved rearwardly. Accordingly, the actuator cylinder 90 is adapted to move the shaft 58 and outer cylinder 56 as a unit, and also the tool change arm 60 which is mounted on the end of the shaft 58, through an axial stroke.

It has been pointed out hereinabove that the outer cylinder 56 is prevented from rotating within the housing 54, whereas the shaft 58 is adapted to rotate within the cylinder. FIGURE 4 shows a rack member 98 which cooperates with a splined section 100 of the inner shaft 58 so that linear movement of the rack in one direction will rotate the tool transfer means I in a clockwise direction as shown in FIGURE 3 and movement of the rack in the opposite direction will rotate the tool transfer means in a counterclockwise direction. It will be understood that the provision of the splined shaft section 100 permits the rack 98 to be operatively associated with the shaft 58 whether the latter is in its axially forward position or its axially rearward position. The non-rotatable outer cylinder 56 is cut away as shown at 102 in FIGURE 4 so as to permit the rack 98 to project therethrough into engagement with the splined shaft section 100, and of course the cut-away portion must be of sufficient length to permit the above-described axial movement of the outer cylinder along with the shaft 58.

A hydraulic actuating cylinder 104 is secured to the side of the housing member 54, and a piston rod 106 extends therefrom into threaded engagement with the rack member 98 for moving the rack linearly within the housing 54 and thereby rotating the tool change arm 60. The rack 98 as shown in FIGURE 4 is in its right hand position which corresponds to the horizontal position of the tool change arm 60 as shown in solid lines in FIGURES 2, 3, 4 and 5. Actuation of the cylinder 104 to move the rack 98 to its left hand position as viewed in FIGURE 4 will rotate the tool change arm 60 to its vertical position as shown in solid lines in FIGURE 1 and in dash lines in FIGURES 3 and 4. As previously explained, when the rotatable arm 60 is in its horizontal position it cooperates with the spindle 24, and when in its vertical position at the interchange station it cooperates with the exchanger II.

In order to carry out the sequence of operations described earlier herein, stop means or the like are required in order to provide three axial positions of the arm 60 and two rotational positions of the arm. FIGURE 6 illustrates the manner of stopping the arm 60 in a desired rotational position. The forward end of the non-rotatable outer cylinder 56 is cut away to provide a pair of stop surfaces 108 and 109, and the inner shaft 58 carries a stop member 110 which is secured thereto by a cap screw 112 and which cooperates with the surfaces 108 and 109 to limit the rotational travel of the shaft 58. The surfaces 108 and 109 are arranged to permit the shaft 58 to rotate through an angle of 90 degrees and to position the arm 60 in a horizontal position at one end of its rotary travel and in a vertical position at the other end of its travel. It should of course be understood that numerous other embodiments will readily occur to those skilled in the art wherein the rotary travel of the arm 60 may be other than 90 degrees.

As explained hereinabove, the cylinder 56, the shaft 58 and the rotatable arm assembly 60 move together through an axial stroke so as to be positioned in either of three axial positions, namely, an extreme rearward retracted position, an intermediate axial position for aligning the gripping means 32 with the flange portion 30 on a tool which is in the spindle 24, and an extreme forward axial position. The extreme rearward and forward axial positions may be controlled by the stroke of the piston rod 92 which is associated with the actuating cylinder 90 and connects with the rear of the shaft 58. The intermediate axial position is controlled in the embodiment being described by a pin 114 (see FIGURE 5) which cooperates with a recess 115 formed in the outer surface of the cylinder 56. The pin 114 is disposed within a housing member or cylinder 116 which is secured to the side of the housing 54, and a piston 117 carried on the end of the pin is slidable within the cylinder 116. The pin 114 is biased to an inoperative retracted position by a compression spring 118 and is moved to an extended operative position by introducing fluid under pressure through a fluid line 119 into a chamber 120 within the cylinder so as to move the piston 117 against the force of the compression spring.

When the arm 60 is in the fully retracted position as in FIGURE 1 and it is desired to move it axially forwardly to a position where the gripper 32 thereon is aligned with a flanged portion 30 on a tool in the spindle 24, the pin 114 is moved to its extended operative position and the arm 60 is then moved axially forwardly until the pin drops into the recess 115 in the cylinder 56. Similarly, if the arm 60 is in its extreme forward position and is holding a newly selected tool in alignment with the spindle 24 for insertion therein, the pin 114 is moved to its operative position and the arm 60 is moved axially rearwardly until the pin falls in the recess 115, whereby the new tool will be positioned within the spindle.

In addition to the stop means illustrated in FIGURE 6 for limiting the rotary movement of the arm 60, it is desirable to provide lock means for locking the arm in the vertical position when it is also in its fully retracted position. Thus, the vertical and fully retracted axial position of the arm 60 as shown in FIGURE 1 comprises the neutral position of the arm, and it remains in this position when the machine tool spindle 24 is operating and the tool changing apparatus is inoperative. It is thus desirable to lock the arm 60 in the neutral position so that in the event pressure is accidentally lost in the rack actuating cylinder 104, the arm 60 will not be permitted to drift away from its vertical position. In the present embodiment, locking of the arm 60 in the neutral position is effected by providing a cutout or recess 122 (best shown in FIGURE 3) in the front of the housing 54, whereby when the arm 60 is in its vertical position and is then moved to its extreme rearward or retracted axial position, it will be seated in the recess 122 as shown in FIGURE 1 and will thereby be locked against rotation.

FIGURE 3 illustrates the combined horizontal shuttle and exchanger II, and there is shown an exchanger member 124 which is mounted on a shaft 126 for rotation therewith. The shaft 126 is rotatably supported in a body portion 128 which slides horizontally on the guide rods 38 and 40. The rods 38 and 40 are supported from the head 52 of the machine tool 20 by brackets 127 and 129, and the body portion 128 is operatively connected with the drive chain 46 as previously described. The exchanger member 124 is rotatable through an angle of 180 degrees by rack actuating mechanism (shown best in FIGURE 4) comprising a hydraulic actuating cylinder 130, a piston rod 132, a rack member 134, and a pinion 136 which is formed on the shaft 126 and is operatively engaged with the rack member so as to be rotated thereby. The stroke of the piston rod 132 may be controlled so as to limit the rotary travel of the exchanger member 124 to an angle of 180 degrees.

As described earlier, the exchanger member 124 is provided with a pair of sockets 36 and 50, one adapted to support a newly selected tool which has been removed from the storage matrix IV, and the other adapted to receive from the tool change arm 60 an old tool which has been removed from the spindle 24. The sockets 36 and 50 are disposed on opposite sides of the shaft 126 with which the exchanger 124 rotates, whereby when the exchanger is rotated 180 degrees, the positions of the two sockets will be interchanged. The sockets 36 and 50 are adapted to receive a shank portion 138 (see FIGURE 5) of a tool holder 26, and the latter may be retained in one of the sockets by any suitable releasable latch mechanism (not shown). A tapered socket and associated latch mechanism for holding a tool therein is disclosed in the co-pending application of Harry R. Dziedzic and Edward M. Alisauskis, Serial No. 197,745, filed May 25, 1962, which application is assigned to the assignee of the present invention.

The earlier description of the operation of the tool changing apparatus of the present invention will now be briefly supplemented to incorporate references to the specific actuating mechanism which has been described. A tool changing cycle is usually begun when the spindle 24 has stopped, and it will be assumed that at such time the rotatable arm 60 is locked in its neutral position as shown in FIGURE 1, and that a new tool has been removed from the storage matrix IV and is being held in the position shown in dash lines at the right hand portion of FIGURE 3 by the gripper 34 on the vertical shuttle III. It will also be assumed that the combined exchanger and horizontal shuttle II is in its rearward position as shown in dotted lines in FIGURE 2.

At the beginning of a tool changing cycle the chain drive motor 48 is operated to move the exchanger II forwardly to seat the new tool in the upper exchanger socket, which as shown in FIGURE 3 is the socket 36. Then, after the shuttle gripper 34 is opened and moved upwardly out of the path of the exchanger II, the latter is moved further forwardly to the interchange position as shown in FIGURES 1-3, at which time the upper socket 36 is carrying a new tool and the lower socket 50 is empty.

While the new tool is being carried forward by the exchanger II, the tool transfer means I is actuated to remove the old tool from the spindle 24 and carry it to the interchange position for transfer to the socket 50 of the exchanger. Thus, pressure is supplied to the chamber 120 (see FIGURE 5) to extend the stop pin 114 to its operative position, and pressure is then supplied to the cylinder 90 to move the rotatable arm 60 forwardly until the pin 114 falls in the recess 115 in the outer cylinder 56. At this time the arm 60 will be in its intermediate axial position with the gripper 32 aligned with a flange portion 30 on a tool in the spindle, and the arm 60 will be disposed out of the seat 122 so that it will be free to rotate.

Pressure is next supplied to the cylinder 104 (see FIGURE 4) to actuate the rack 98 and rotate the arm 60 through an angle of 90 degrees in a counterclockwise direction to a horizontal position as shown in FIGURES 2, 3, 4 and 5. The gripper jaws 32 are then closed by releasing the pressure from the chamber 66 (see FIGURE 5) so as to permit the springs 82 to urge the gripper actuating pin 78 forwardly. In this manner, the gripper 32 engages a flange portion 30 on a tool in the spindle. Pressure is then released from the chamber 120 and the stop pin 114 is thereby retracted to an inoperative position by the spring 118, and thereafter the cylinder 90 will cause the arm 60 to be moved to its extreme forward axial position as illustrated in FIGURES 2, 3 and 5 to withdraw the old tool from the spindle 24.

Figure 4:
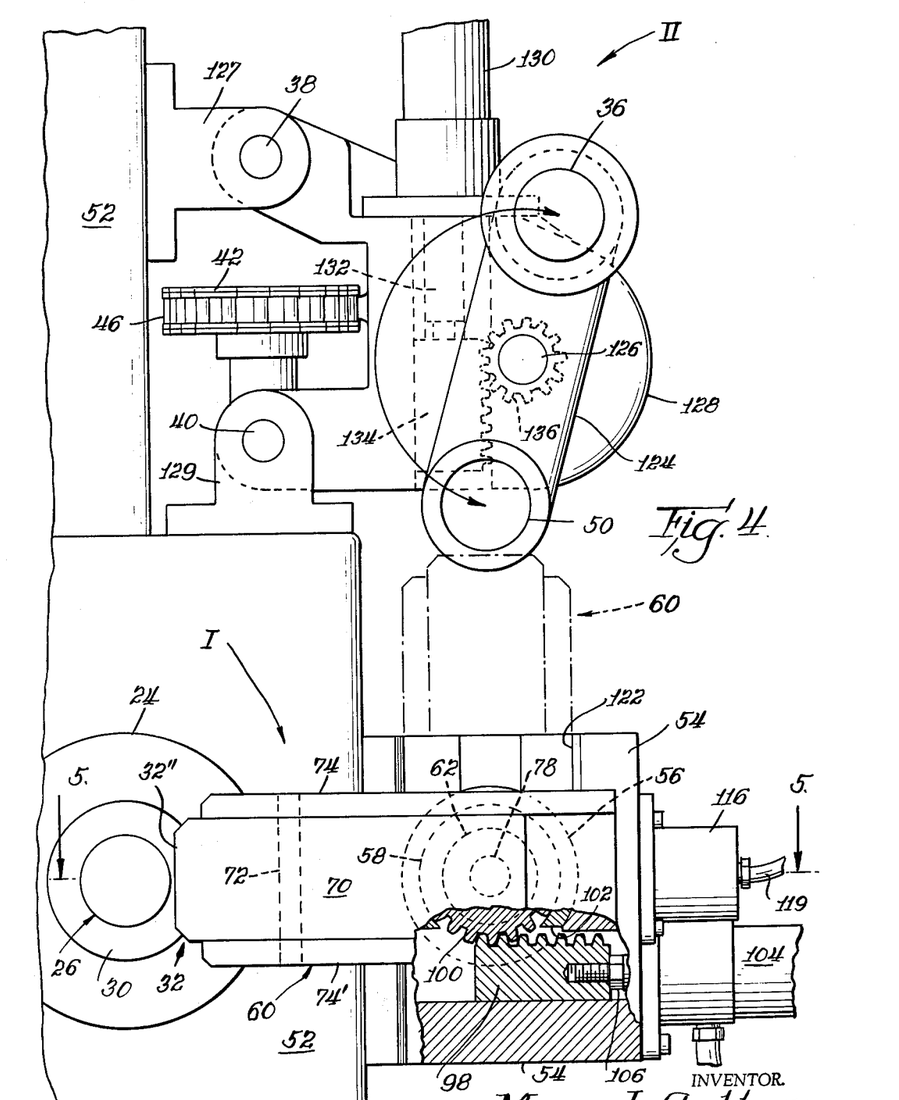
FIGURE 4 is a substantially enlarged front elevational view, partly broken away and partly in section, taken substantially along the line 4—4 of FIGURE 2.

Having removed the old tool from the spindle, the cylinder 104 is actuated to rotate the arm 60 through an angle of 90 degrees in a clockwise direction so as to position the arm in a vertical position as shown in dotted lines in FIGURE 4, and the cylinder 90 is then actuated to move the arm 60 to its extreme rearward position to insert the old tool in the lower socket 50 in the exchanger member 124. Pressure is next supplied through the line 86 (see FIGURE 5) to the chamber 66 to open the gripper jaws 32 on the arm 60, and with the arm 60 at the interchange position and the jaws 32 open, pressure is supplied to the actuating cylinder 130 (see FIGURE 4) to rotate the exchanger member 124 through an angle of 180 degrees. In this manner, the positions of the new tool and the old tool are interchanged, after which the pressure is released from the chamber 66 to permit the jaws 32 to close on a flange portion 30 on the new tool.

The arm 60 is next moved to its extreme forward axial position through operation of the cylinder 90, after which the cylinder 104 is actuated to rotate the arm through an angle of 90 degrees in a counterclockwise direction. In this manner, the arm 60 is moved to its horizontal position as shown in FIGURES 2, 3 and 5, with the new tool being held in alignment with the spindle 24. Pressure is then supplied to the chamber 120 (see FIGURE 5) to extend the stop pin 114 to its operative position, and the cylinder 90 is actuated to move the arm 60 rearwardly until the stop pin projects into the recess 115 in the cylinder 56, whereby the new tool is inserted into the spindle 24, after which the tool is locked in the spindle by chucking mechanism (not shown). The gripper jaws 32 are opened by supplying pressure to the chamber 66 (FIGURE 5), and the arm 60 is then rotated 90 degrees in the clockwise direction through actuation of the cylinder 104. Thereafter, pressure is released from the chamber 120 to retract the stop pin 114, and the cylinder 90 is actuated to move the arm 60 to its fully rearward retracted position wherein it is seated in the recess 122 as shown in FIGURE 1 and is thereby locked in its neutral position. During the delivery of the new tool to the spindle 24, the chain drive motor 48 may be operated to move the combined horizontal shuttle and exchanger II rearwardly in order to transfer the old tool to the vertical shuttle III for return to the storage matrix IV.

It will be understood that the foregoing description relates only to a preferred embodiment and that numerous modifications may be made therein without departing from the present invention. For example, while I have described the tool transfer means I as comprising a rotatable arm 60, it will be understood that a linearly movable member may be utilized to transport a tool between the spindle and the interchange position. It will also be understood that various forms of exchangers may be utilized, and it is not essential that the exchanger rotate about an axis parallel to the spindle axis, nor is it essential that the exchanger itself move forwardly and rearwardly since a separate horizontal shuttle may be used. In addition, it will be understood that the invention is not limited to the use of flange gripping means on the rotatable arm 60 or to the use of sockets on the exchanger, it being essential only that the tool transfer means I have means for carrying only one tool at a time, while the exchanger II be provided with at least two tool holding means.

In the embodiment of the invention which has been fully described hereinabove in conjunction with FIGURES 1-6, an old tool is withdrawn from the spindle 24, and a new tool is inserted in the spindle, through axial movement of the tool transfer means I, and in particular by the rotatable arm assembly 60. In accordance with an alternative embodiment of the invention, separate axial transport means is provided to grip an old tool in the spindle and withdraw it to an axially forward transfer position where it can then be gripped by the rotatable arm 60 and transported radially away from the spindle axis to the interchange position. Similarly, when a newly selected tool is to be transported from the interchange position to the spindle 24, the arm 60 may simply be rotated 90 degrees in a counterclockwise direction as earlier described so as to position the new tool forwardly of the spindle and in axial alignment therewith as shown in FIGURES 2, 3 and 5. With the new tool thus positioned, the above-mentioned separate axial transport means may take the tool and move it axially rearwardly into the spindle.

When axial transport means is used in the manner described above, the rotatable arm 60 need not move axially when it is in its horizontal position. In fact, the rotatable arm 60 can be arranged to move in a single plane without moving axially either when in its horizontal position or when in its vertical position. In the first embodiment described herein, the arm 60 moves axially rearwardly when in its vertical position so as to insert an old tool into the exchanger socket 50, and it moves axially forwardly to remove a new tool from the other exchanger socket. However, it will be understood that the combined exchanger and horizontal shuttle II can be adapted to move axially toward the arm 60 to receive an old tool which is carried by the arm, and the exchanger can be moved rearwardly to release a new tool which has been transferred therefrom to the arm 60.

Accordingly, if desired, the rotatable arm 60 can be made movable in a single plane only when used in conjunction with the axial transport means of the alternative embodiment. On the other hand, if it is desired to provide a neutral position for the rotatable arm 60 wherein it is substantially retracted rearwardly relative to its usual plane of operation, then it will be necessary to provide for axial movement of the arm 60 when it is in its vertical position, whereby it can be retracted to a neutral position such as shown in FIGURE 1.

Figure 7A:
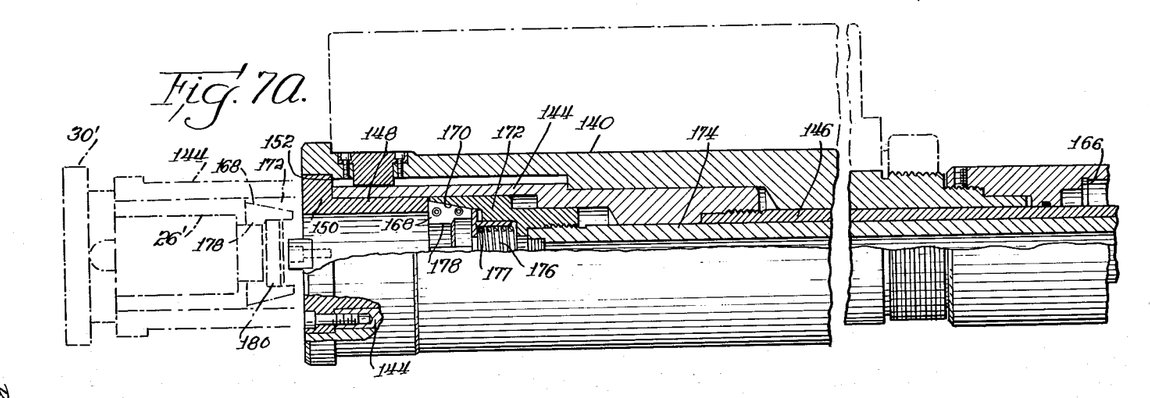
FIGURES 7a and 7b, when taken together and viewed side-by-side, comprise a substantially enlarged view, partly in section and partly in side elevation, of a machine tool spindle having axial tool transport means housed therein in accordance with an alternative embodiment of the invention.
Figure 7B:
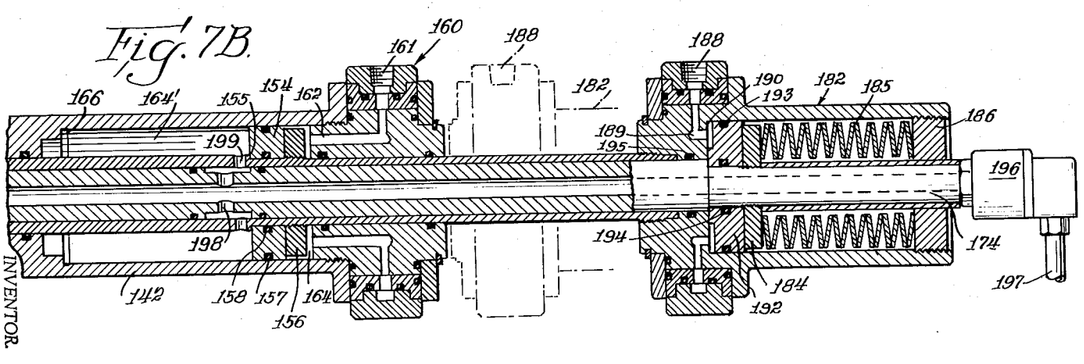

FIGURES 7a and 7b illustrate axial transport means in accordance with the alternative embodiment of the invention. There is shown a machine tool spindle 140 which is rotatable in the usual manner and is axially fixed relative to an associated machine tool. A rearward axially fixed spindle extension is shown at 142. Within the axially fixed spindle sections 140 and 142 there is housed an axially slidable assembly including a collet housing member 144 and a tubular member 146 which is threaded into the rear end of the collet housing and extends rearwardly therefrom. A retainer 148 is threaded into the forward end of the collet housing 144, and the retainer has a flange 150 which bears against an internal shoulder 152 on the spindle 140 when the axially slidable assembly is in its retracted position as shown in solid lines.

A ring member 154 is mounted on the tubular member 146 and is held against a shoulder 155 thereon by a nut 156 which is threaded on the tubular member so as to bear against the ring 154 and urge the latter forwardly against the shoulder. The ring member 154 carries external and internal O-rings 157 and 158 which produce a fluid-tight seal between the spindle extension 142 and the tubular member 146. At the rear end of the spindle extension 142 there is mounted a fluid connector housing 160 having fluid inlet passages 161 and 162 which communicate with a fluid chamber 164. When fluid under pressure is supplied to the inlet passage 161, the fluid will be conducted to the chamber 164 and will act upon the nut 156 and ring 154 to move the collet housing 144, the tubular member 146, and the various components housed therein, axially forwardly as a unit to the extended position indicated in dash lines in FIGURES 7a, at which time the ring 154 will engage a shoulder 166 which is formed in the spindle extension 142 and which serves as an axial stop.

A radially compressible collet 168 is disposed within the collet housing 144 so as to bear against the rear end of the retainer 148, and the collet 168 is positioned within a frusto-conical recess 170 formed in the forward end of an actuator 172. An inner tubular member 174 is threaded into the rear of the actuator 172 and extends rearwardly therefrom. The actuator 172 is slidable axially within the collet housing 144, and the compressible collet 168 which is disposed in the forward end thereof is urged forwardly against the retainer 148 by means of a compression spring 176 and a retainer 177 which are disposed immediately rearwardly of the collet and within the actuator 172.

The collet 168 is provided with a plurality of internal lugs such as shown at 178 which are adapted to engage against an enlarged head portion 180 formed on the rear end of a tool holder or the like 26' when the collet is compressed radially inwardly. The collet 168 is biased to a radially outward open or released position and is compressed to a closed position by forward movement of the actuator 172. For a more complete description of the collet structure, reference is made to the co-pending application of Harry R. Dziedzic, Serial No. 231,358, filed October 18, 1962, now Patent No. 3,168,322.

A spring housing 182 is mounted on the rear end of the tubular member 146, and the actuator tube 174 extends through the interior of the housing. A nut 184 is threaded on a portion of the actuator tube 174 and is disposed within the spring housing 182 so as to be biased forwardly by compression spring means comprising a plurality of Belleville spring washers 185 which are positioned over the rear end of the tube 174 between the nut 184 and a plug 186 which is threaded into the rear end of the spring housing.

A fluid inlet passage 188 is formed in the spring housing 182 and leads to a passage 189 which communicates with a pressure chamber 190. A ring member 192 is positioned immediately forwardly of the nut 184 and carries external and internal O-ring 193 and 194 which together with an O-ring 195 positioned forwardly thereof in the spring housing form the sealed chamber 190. It will now be understood that the Belleville spring washers 185 act upon the nut 184 to urge the actuator tube 174 and actuator 172 forwardly and thereby bias the collet 168 to its closed position as shown in FIGURE 7a, and that introduction of fluid under pressure into the inlet 188 and thus into the pressure chamber 190 will act upon the ring 192 so as to move the nut 184 and actuator tube 174 rearwardly against the force of the springs 185 to permit the collet 168 to expand to its open position.

At the rear of the spring housing 182 there is mounted a fluid connector 196 having a fluid inlet 197. The connector 196 is threaded into the rear end of the actuator tube 174 whereby fluid under pressure introduced into the inlet 197 will pass through the interior of the tube 174 and then out through radial apertures 198 formed in the tube 174 and radial apertures 199 formed in the outer tubular member 146 so as to pass into a pressure chamber 164' which is on the forward side of the ring member 154 and thus opposite the pressure chamber 164. As previously explained, introduction of fluid under pressure through the inlet 161 into the chamber 164 will cause the axial transport means to move to its axially forward extended position, and it will now be seen that introduction of pressure into the inlet 197 will cause the axial transport means to move rearwardly to its retracted position within the spindle 140.

The operation of the foregoing axial transport means will now be described, and it will be assumed that the axially slidable assembly is retracted within the spindle 140 as shown in solid lines in the drawings, and that a tool 26' is positioned in the spindle and held by the collet 168 which is in its closed position. When the spindle 140 has stopped with an old tool gripped therein, and it is desired to carry out a tool changing operation, fluid under pressure is first supplied to the fluid inlet 161 so as to apply a forward force to the nut 156 and thereby move the axial transport means forwardly until the ring 154 engages the stop shoulder 166, at which time the axial transport means will be in its forward position wherein it extends forwardly from the spindle 140. As previously described, the axially movable transport means includes the collet housing 144 and tube 146, and the various components housed therein, also including the spring housing 182 which is carried at the rear of the actuator tube 174.

With the axial transport means holding the old tool in the extended axial position, the rotatable arm 60 will grip a flange portion 30 on the tool, after which pressure is supplied to the fluid inlet 188 in order to move the actuator 172 rearward and thereby open the collet 168. After the collet 168 is opened, pressure is supplied to the fluid inlet 197 so as to supply fluid under pressure to the chamber 164' and thereby move the axial transport means rearwardly to its retracted position within the spindle.

After the rotatable arm 60 has delivered the old tool to the exchanger II and has returned with a new tool which is held thereby in a forward axial position in alignment with the spindle 140, fluid under pressure is again supplied to the inlet 161 to extend the axial transport means to its forward position, after which pressure is released at the inlet 188 so as to permit the springs 185 to move the actuator tube 174 and actuator 172 forwardly to close the collet 168. Once the arm 60 has been moved away, pressure is again supplied at the inlet 197 so as to move the axial transport means rearwardly to its retracted position within the spindle, at which time the rotation of the spindle may commence to perform a further machining operation.

Figure 8:
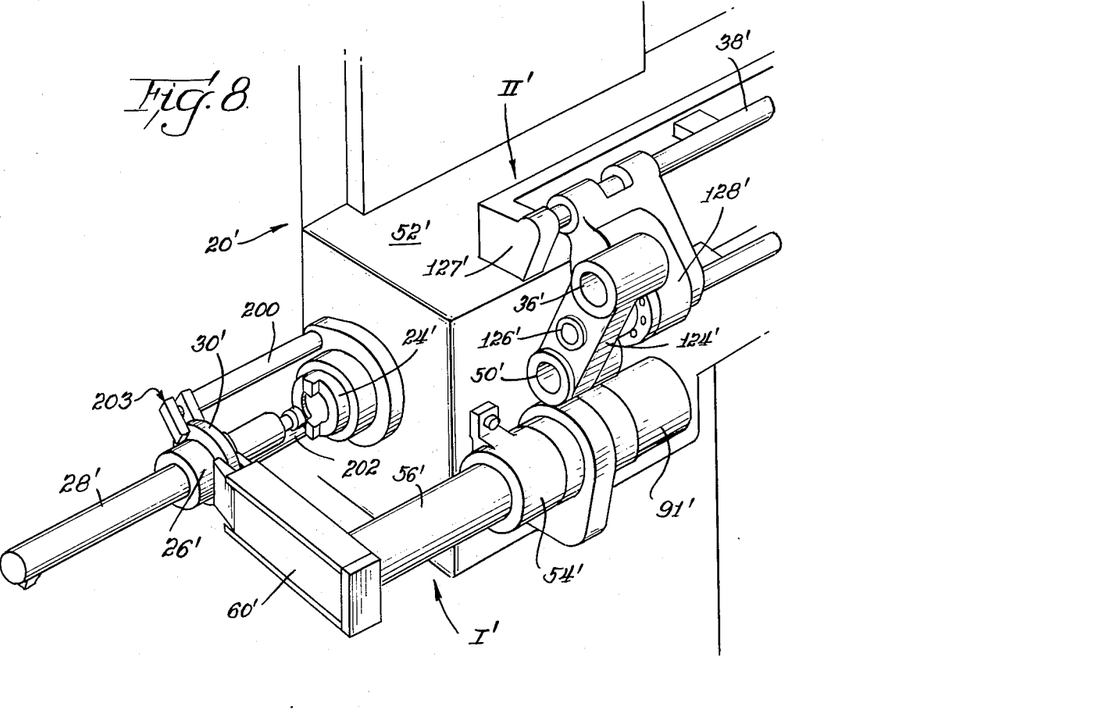
FIGURE 8 is a fragmentary perspective view illustrating a machine tool having tool changing apparatus including axial transport means, the latter means being shown external with respect to the spindle and comprising a modification of the axial transport means of FIGURES 7a and 7b.
Figure 9:
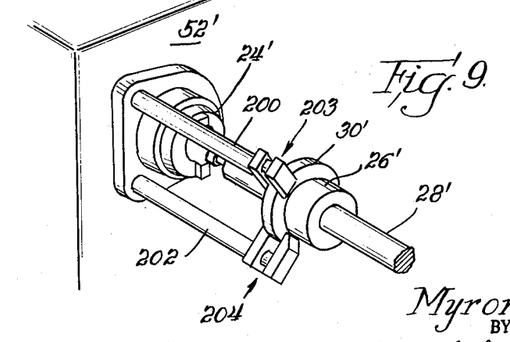
FIGURE 9 is a fragmentary perspective view illustrating the axial transport means of FIGURE 8.

FIGURES 8 and 9 show a modified form of the axial transport means described hereinabove. In the modified embodiment, the axial transport means is external to the spindle rather than internal as in the previous embodiment. Apart from the axial transport means, the other components shown in FIGURE 8 are generally similar to the apparatus of FIGURE 3, and corresponding elements are thus identified with corresponding primed reference numerals. The axial transport means of FIGURES 8 and 9 comprises a pair of rods 200 and 202 which extend from the head portion 52' of the machine tool and are axially slidable between forward extended positions as shown and substantially retracted positions. It will be noted that the rods 200 and 202 are external of the spindle 24' and that they are provided with flange gripping means 203 and 204 at their respective outer ends. In addition to being axially slidable between forward and retracted positions, the rods 200 and 202 are rotatable through a predetermined angle, and the gripping means 203 and 204 thereon are adapted to be opened and closed simultaneously.

In operation, the rods 200 and 202 are normally fully retracted with the gripping means 203 and 204 disposed rearwardly of the forward end of the spindle 24'. When it is desired to carry out a tool changing operation, the rods are moved axially forwardly to an intermediate axial position wherein the gripping means 203 and 204 are aligned with a flange portion 30' on a tool which is held in the spindle. The rods 200 and 202 are then rotated so as to dispose the open gripping members 203 and 204 in a position where the gripping jaws encompass the flange portion 30' on the tool, after which the gripping members are closed to grip the tool. The rods 200 and 202 are next moved axially forwardly to withdraw the old tool from the spindle 24' and hold it in an axially forward position as shown in FIGURE 8, whereby the rotatable arm 60' may be rotated into a horizontal position as shown in order to also grip a portion of the flange 30' on the tool.

As soon as the arm 60' has gripped the old tool, the gripping members 203 and 204 on the axial transport means are opened, and the arm 60' is then free to rotate 90 degrees in a clockwise direction so as to deliver the tool to the exchanger II' and return to the position shown in FIGURE 8 with a newly selected tool. Once the arm 60' has positioned a new tool with its flange portion 30' disposed between the open jaws of the axial transport gripping means 203 and 204, the latter gripping means are closed, and the arm 60' is rotated back to its vertical position. The rods 200 and 202 are then moved rearwardly to their intermediate axial position to insert the new tool in the spindle 24', after which the gripping means 203 and 204 are opened, the rods are rotated to swing the gripping means away from the flange portion 30' on the new tool in the spindle, and the rods are fully retracted.

It will be seen that it is not necessary to rotate the rods 200 and 202 when they are in their extreme forward axial positions as shown in FIGURES 8 and 9. However, it is preferable to provide for rotation of the rods when they are in their intermediate axial position with the gripping means aligned with the flange 30' on a tool in the spindle, since such rotation permits the gripping means to be swung away from the tool and then fully retracted so as to dispose them rearwardly of the end of the spindle and thus completely out of the way during a machining operation.

It will be noted that the movement of the rods 200 and 202 is substantially the same as the movement of the tool transport means I, and in particular the rotatable arm assembly 60, in that they move axially, they rotate through a predetermined angle, and the gripper means at the ends thereof open and close. Accordingly, it will be understood that actuating mechanism of the type disclosed in FIGURES 4 and 5 in conjunction with the rotatable arm 60 may be utilized for operation of the axial transport rods 200 and 202 and the gripping means 203 and 204 carried thereon.

While certain preferred forms of my invention have been described and illustrated, it will be appreciated that modifications and changes may be made therein by those skilled in the art, particularly with my disclosure before them, and thus I do not intend to be limited to the particular disclosure, except insofar as the appended claims are so limited. In particular, it should be understood that while the tool changing mechanism of the present invention has been described in conjunction with a machine tool having a horizontal spindle, it may also be used in conjunction with a machine tool having a vertical spindle, and thus terms such as "forwardly," "rearwardly," and the like are used with reference to a machine tool with a horizontal spindle and should not be strictly limited where a vertical spindle is used. In addition, it should be understood that when it is stated herein or in the appended claims that the tool transfer means I is adapted to transport an old tool which has been removed from the spindle, such language is intended to apply whether the tool transfer means I itself removes the tool from the spindle, whether the tool is removed from the spindle by separate axial transport means as described herein, or whether the spindle itself is movable axially to transport a tool to an axially forward position where it is taken by the tool transfer means I. The tool transfer means I includes the rotatable tool change arm 60 having a single gripper 32, and as previously described herein the present invention is partially based on the concept of combining the tool transfer means I which carries only one tool at a time with the exchanger II which can carry two such tools at one time. Accordingly, in the appended claims the tool holding means 32 is defined as "consisting of means for holding one tool at a time," and such language is not intended to apply to tool transfer means which is designed to carry more than one tool simultaneously.

I claim:

1. In automatic tool changing apparatus for use with a machine tool for transferring a selected tool from a tool storage member to a machine tool spindle and subsequently back again to the storage member, the improvement comprising, in combination, tool transfer means for transporting an old tool which has been removed from said spindle to an interchange position which is radially spaced from the spindle axis and is also spaced from said tool storage member, said tool transfer means having tool holding means consisting of means for holding one tool at a time, and an exchanger member independent of said storage member and disposed at said interchange position and having a pair of tool holding means adapted to hold a pair of tools simultaneously, said exchanger being adapted to receive said old tool from said tool transfer means and deliver a newly selected tool to said tool transfer means whereby the newly selected tool may be transported to said spindle.

2. In automatic tool changing apparatus for use with a machine tool for transferring a selected tool from a tool storage member to a machine tool spindle and subsequently back again to the storage member, the improvement comprising, in combination, tool transfer means for transporting an old tool which has been removed from said spindle to an interchange position which is radially spaced from the spindle axis and is also spaced from said tool storage member, said tool transfer means having tool holding means consisting of means for holding one tool at a time, a rotatable exchanger member independent of said storage member and having a pair of tool holding means adapted to hold a pair of tools simultaneously, said exchanger being adapted to support in one of its holding means a newly selected tool which has been removed from said storage member and said exchanger being disposed at said interchange position so as to receive in the other of its holding means the old tool from said tool transfer means, and means for rotating said exchanger so as to move said old tool away from said tool transfer holding means and deliver said new tool thereto whereby the newly selected tool may be transported to said spindle.

3. In automatic tool changing apparatus for transferring a selected tool from a tool storage member to a machine tool spindle and subsequently back again to the storage member, the improvement comprising, in combination, tool transfer means for transporting an old tool which has been removed from said spindle to an interchange position which is radially spaced from the spindle axis and is also spaced from said tool storage member, said tool transfer means having tool holding means consisting of means for holding one tool at a time, a rotatable exchanger member independent of said storage member and having a pair of tool holding means adapted to hold a pair of tools simultaneously, shuttle means for removing a newly selected tool from said storage member and delivering said tool to one of the tool holding means of said exchanger, said exchanger being movable to said interchange position so as to receive in the other of its holding means the old tool from said tool transfer means, and means for rotating said exchanger so as to move said old tool away from said tool transfer holding means and deliver said new tool thereto whereby the newly selected tool may be transported to said spindle.

4. In automatic tool changing apparatus for transferring a selected tool from a tool storage member to a machine tool spindle and subsequently back again to the storage member, the improvement comprising, in combination, tool transfer means for transporting an old tool which has been removed from said spindle to an interchange position which is radially spaced from the spindle axis and is also spaced from said tool storage member, said tool transfer means having tool holding means consisting of means for holding one tool at a time, a horizontal shuttle movable forwardly and rearwardly along a path parallel to the axis of said spindle, a rotatable exchanger member independent of said storage member and mounted on said shuttle for movement therewith and having a pair of tool holding means adapted to hold a pair of tools simultaneously, said exchanger being adapted to support in one of its holding means a newly selected tool which has been removed from said storage member and said exchanger being movable forwardly with said shuttle to said interchange position wherein it is adapted to receive in the other of its holding means the old tool from said tool transfer means, and means for rotating said exchanger so as to move said old tool away from said tool transfer holding means and deliver said new tool thereto whereby the newly selected tool may be transported to said spindle.

5. In automatic tool changing apparatus for use with a machine tool for transferring a selected tool from a tool storage member to a machine tool spindle and subsequently back again to the storage member, the improvement comprising, in combination, rotatable tool transfer means for transporting an old tool which has been removed from said spindle to an interchange position which is radially spaced from the spindle axis and is also spaced from said tool storage member, said tool transfer means having tool holding means consisting of means for holding one tool at a time, and said tool transfer means comprising an arm which is mounted at one end for rotation about an axis parallel to said spindle axis and is provided with its tool holding means adjacent its opposite end, a rotatable exchanger member independent of said tool storage member and having a pair of tool holding means adapted to hold a pair of tools simultaneously, said exchanger being adapted to support in one of its holding means a newly selected tool which has been removed from said storage member and said exchanger being disposed at said interchange position so as to receive in the other of its holding means the old tool from said rotatable arm, and means for rotating said exchanger so as to move said old tool away from the tool holding means on said rotatable arm and deliver said new tool thereto whereby the newly selected tool may be transported to said spindle.

6. In automatic tool changing apparatus for use with a machine tool for transferring a selected tool from a tool storage member to a machine tool spindle and subsequently back again to the storage member, the improvement comprising, in combination, rotatable tool transfer means for transporting an old tool which has been removed from said spindle to an interchange position which is radially spaced from the spindle axis and is also spaced from said tool storage member, said tool transfer means having tool holding means consisting of means for holding one tool at a time, and said tool transfer means comprising an arm which is rotatably mounted at one end and is provided with its tool holding means adjacent its opposite end, a horizontal shuttle movable forwardly and rearwardly along a path parallel to the axis of said spindle, a rotatable exchanger member independent of said tool storage member and mounted on said shuttle for movement therewith and having a pair of tool holding means adapted to hold a pair of tools simultaneously, said exchanger being adapted to support in one of its holding means a newly selected tool which has been removed from said storage member and said exchanger being movable forwardly with said shuttle to said interchange position wherein it is adapted to receive in the other of its holding means the old tool from said rotatable arm, and means for rotating said exchanger so as to move said old tool away from the tool holding means on said rotatable arm and deliver said new tool thereto whereby the newly selected tool may be transported to said spindle.

7. In automatic tool changing apparatus for use with a machine tool for transferring a selected tool from a tool storage member to a machine tool spindle and subsequently back again to the storage member, the improvement comprising, in combination, rotatable and axially movable tool transfer means for removing an old tool from said spindle and delivering the tool to an interchange position which is radially spaced from the spindle axis and is also spaced from said tool storage member, said tool transfer means having tool holding means consisting of means for holding one tool at a time, and said tool transfer means comprising an arm which is mounted at one end for rotation and axial movement relative to an axis parallel to said spindle axis and which is provided with said tool holding means adjacent its opposite end, a rotatable exchanger member independent of said storage member and having a pair of tool holding means adapted to hold a pair of tools simultaneously, said exchanger being adapted to support in one of its holding means a newly selected tool which has been removed from said storage member and said exchanger being disposed at said interchange position so as to receive in the other of its holding means the old tool from said rotatable arm, means for moving said arm axially to withdraw an old tool from said spindle and means for rotating said arm to transport said old tool to said interchange position for transfer to said exchanger, and means for rotating said exchanger so as to move said old tool away from the tool holding means on said rotatable arm and deliver said new tool thereto whereby the newly selected tool may be transported to said spindle and inserted therein through further rotational and axial movement of said arm.

8. In automatic tool changing apparatus for use with a machine tool for transferring a selected tool from a tool storage member to a machine tool spindle and subsequently back again to the storage member, the improvement comprising, in combination, tool transfer means for transporting an old tool which has been removed from said spindle to an interchange position which is radially spaced from the spindle axis and is also spaced from said tool storage member, said tool transfer means having tool holding means consisting of means for holding one tool at a time, an exchanger member independent of said storage member and having a pair of spaced apart tool holding means adapted to hold a pair of tools simultaneously, said exchanger being rotatable about an axis parallel to said spindle axis and intermediate said pair of tool holding means, and said exchanger being adapted to support in one of its holding means a newly selected tool which has been removed from said storage member and said exchanger being disposed at said interchange position so as to receive in the other of its holding means the old tool from said tool transfer means, and means for rotating said exchanger so as to move said old tool away from said tool transfer holding means and deliver said new tool thereto whereby the newly selected tool may be transported to said spindle.

9. In automatic tool changing apparatus for use with a machine tool for transferring a selected tool from a tool storage member to a machine tool spindle and subsequently back again to the storage member, the improvement comprising, in combination, rotatable tool transfer means for transporting an old tool which has been removed from said spindle to an interchange position which is radially spaced from the spindle axis and is also spaced from said tool storage member, said tool transfer means having tool holding means consisting of means for holding one tool at a time, and said tool transfer means comprising an arm which is mounted at one end for rotation about an axis parallel to said spindle axis and which is provided with said tool holding means adjacent its opposite end, an exchanger member independent of said storage member and having a pair of spaced apart tool holding means adapted to hold a pair of tools simultaneously, said exchanger being rotatable about an axis which is parallel to said spindle axis and intermediate said pair of tool holding means, said exchanger also being adapted to support in one of its holding means a newly selected tool which has been removed from said storage member and said exchanger being disposed at said interchange position so as to receive in the other of its holding means the old tool from said rotatable arm, and means for rotating said exchanger so as to move said old tool away from the tool holding means on said rotatable arm and deliver said new tool thereto whereby the newly selected tool may be transported to said spindle.

10. In automatic tool changing apparatus for use with a machine tool for transferring a selected tool from a tool storage member to a machine tool spindle and subsequently back again to the storage member, the improvement comprising, in combination, rotatable tool transfer means for removing and old tool from said spindle and delivering the tool to an interchange position which is radially spaced from the spindle axis and is also spaced from said tool storage member, said tool transfer means having tool holding means consisting of means for holding one tool at a time, and said tool transfer means comprising an arm which is mounted at one end for rotation and axial movement relative to an axis parallel to said spindle axis and which is provided with said tool holding means adjacent its opposite end, a horizontal shuttle movable forwardly and rearwardly along a path parallel to the said spindle axis, an exchanger independent of said storage member and having a pair of spaced apart tool holding means adapted to hold a pair of tools simultaneously, said exchanger being rotatable about an axis which is parallel to said spindle axis and intermediate said pair of tool holding means, said exchanger also being adapted to support in one of its holding means a newly selected tool which has been removed from said storage member and said exchanger being mounted on said shuttle for movement forwardly with said shuttle to said interchange position wherein it is adapted to receive in the other of its holding means the old tool from said rotatable arm, means for moving said arm axially to withdraw an old tool from said spindle and means for rotating said arm to transport said old tool to said interchange position for transfer to said exchanger, and means for rotating said exchanger so as to move said old tool away from the tool holding means on said rotatable arm and deliver said new tool thereto whereby the newly selected tool may be transported to said spindle and inserted therein through further rotational and axial movement of said arm.

11. In automatic tool changing apparatus for use with a machine tool for transferring a newly selected tool from a tool storage member to a machine tool spindle and for removing an old tool from the spindle and returning it to the storage member, and wherein said tools are of the type having a generally radial flange portion or the like with a flange gripping surface thereon, the improvement comprising, in combination, tool transfer means for transporting an old tool which has been removed from said spindle to an interchange position which is radially spaced from the spindle axis and is also spaced from said tool storage member, said tool transfer means having tool holding means consisting of gripping means for holding one tool at a time, said gripping means being adapted to engage a flange gripping surface on a tool and hold the same through gripping movement in a direction generally parallel to the axis of the tool, a rotatable exchanger member independent of said storage member and having a pair of tool holding means adapted to hold a pair of tools simultaneously, said exchanger being adapted to support in one of its holding means a newly selected tool which has been removed from said storage member and said exchanger being disposed at said interchange position so as to receive in the other of its holding means the old tool from said tool transfer means, and means for rotating said exchanger so as to move said old tool away from said tool transfer gripping means and deliver said new tool thereto whereby the newly selected tool may be transported to said spindle.

12. In automatic tool changing apparatus for use with a machine tool for transferring a newly selected tool from a tool storage member to a machine tool spindle and for removing an old tool from the spindle and returning it to the storage member, and wherein said tools are of the type having a generally radial flange portion or the like with a flange gripping surface thereon, the improvement comprising, in combination, rotatable tool transfer means for transporting an old tool which has been removed from said spindle to an interchange position which is radially spaced from the spindle axis and is also spaced from said tool storage member, said tool transfer means having tool holding means consisting of gripping means for holding one tool at a time, said gripping means being adapted to engage a flange gripping surface on a tool and hold the same through gripping movement in a direction generally parallel to the axis of the tool, and said tool transfer means comprising an arm which is mounted at one end for rotation about an axis parallel to said spindle axis and which is provided with said gripping means adjacent its opposite end, a rotatable exchanger member independent of said storage member and having a pair of tool holding means adapted to hold a pair of tools simultaneously, said exchanger being adapted to support in one of its holding means a newly selected tool which has been removed from said storage member and said exchanger being disposed at said interchange position so as to receive in the other of its holding means the old tool from said rotatable arm, and means for rotating said exchanger while said rotatable arm is disposed at said interchange position with its gripping means open so as to move said old tool away from said gripping means and deliver said new tool thereto whereby the newly selected tool may be transported to said spindle.

13. In automatic tool changing apparatus for use with a machine tool for transferring a newly selected tool from a tool storage member to a machine tool spindle and for removing an old tool from the spindle and returning it to the storage member, and wherein said tools are of the type having a generally radial flange portion or the like with a flange gripping surface thereon, the improvement comprising, in combination, tool transfer means for transporting an old tool which has been removed from said spindle to an interchange position which is radially spaced from the spindle axis and is also spaced from said tool storage member, said tool transfer means having tool holding means consisting of gripping means for holding one tool at a time, said gripping means being adapted to engage a flange gripping surface on a tool and hold the same through gripping movement in a direction generally parallel to the axis of the tool, an exchanger member independent of said storage member and having a pair of spaced apart tool holding means adapted to hold a pair of tools simultaneously, said exchanger being rotatable about an axis which is parallel to said spindle axis and which is intermediate said pair of tool holding means, said exchanger also being adapted to support in one of its holding means a newly selected tool which has been removed from said storage member and said exchanger being disposed at said interchange position so as to receive in the other of its holding means the old tool from said tool transfer means, and means for rotating said exchanger while said tool transfer means is disposed at said interchange position with its gripping means open so as to move said old tool away from said gripping means and deliver said new tool thereto whereby the newly selected tool may be transported to said spindle.

14. In automatic tool changing apparatus for use with a machine tool for transferring a newly selected tool from a tool storage member to a machine tool spindle and for removing an old tool from the spindle and returning it to the storage member, and wherein said tools are of the type having a generally radial flange portion or the like with a flange gripping surface thereon, the improvement comprising, in combination, rotatable tool transfer means for transporting an old tool which has been removed from said spindle to an interchange position which is radially spaced from the spindle axis and is also spaced from said tool storage member, said tool transfer means having tool holding means consisting of gripping means for holding one tool at a time, said gripping means being adapted to engage a flange gripping surface on a tool and hold the same through gripping movement in a direction parallel to the axis of the tool, and said tool transfer means comprising an arm which is mounted at one end for rotation about an axis parallel to said spindle axis and which is provided with said gripping means adjacent its opposite end, an exchanger member independent of said storage member and having a pair of spaced apart tool holding means adapted to hold a pair of tools simultaneously, said exchanger being rotatable about an axis which is parallel to said spindle axis and intermediate said pair of tool holding means, said exchanger also being adapted to support in one of its holding means a newly selected tool which has been removed from said storage member and said exchanger being disposed at said interchange position so as to receive in the other of its holding means the old tool from said rotatable arm, and means for rotating said exchanger while said rotatable arm is disposed at said interchange position with said gripping means open so as to move said old tool away from said gripping means and deliver said new tool thereto whereby the newly selected tool may be transported to said spindle.

15. In automatic tool changing apparatus for use with a machine tool for transferring a selected tool from a tool storage member to a machine tool spindle and subsequently back again to the storage member, the improvement comprising, in combination, tool transfer means for transporting an old tool which has been removed from said spindle to an interchange position which is radially spaced from the spindle axis and is also spaced from said tool storage member, said tool transfer means having tool holding means consisting of means for holding one tool at a time, a rotatable exchanger member independent of said storage member and having a pair of tool holding means adapted to hold a pair of tools simultaneously, each of said exchanger tool holding means comprising a socket adapted to receive a shank portion of a tool for supporting the same, said exchanger being adapted to support in one of its sockets a newly selected tool which has been removed from said storage member and said exchanger being disposed at said interchange position so as to receive in the other of its sockets the old tool from said tool transfer means, and means for rotating said exchanger so as to move said old tool away from said tool transfer holding means and deliver said new tool thereto whereby the newly selected tool may be transported to said spindle.

16. In automatic tool changing apparatus for use with a machine tool for transferring a selected tool from a tool storage member to a machine tool spindle and subsequently back again to the storage member, the improvement comprising, in combination, tool transfer means for transporting an old tool which has been removed from said spindle to an interchange position which is radially spaced from the spindle axis and is also spaced from said tool storage member, said tool transfer means having tool holding means consisting of means for holding one tool at a time, an exchanger member independent of said storage member and having a pair of spaced apart tool holding means adapted to hold a pair of tools simultaneously, each of said exchanger tool holding means comprising a socket parallel to the spindle axis and adapted to receive a shank portion of a tool for supporting the same, said exchanger being rotatable about an axis which is parallel to said spindle axis and intermediate said pair of sockets, said exchanger also being adapted to support in one of its sockets a newly selected tool which has been removed from said storage member and said exchanger being disposed at said interchange position so as to receive in the other of its sockets the old tool from said tool transfer means, and means for rotating said exchanger so as to move said old tool away from said tool transfer holding means and deliver said new tool thereto whereby the newly selected tool may be transported to said spindle.

17. In automatic tool changing apparatus for use with a machine tool for transferring a selected tool from a tool storage member to a machine tool spindle and subsequently back again to the storage member, the improvement comprising, in combination, rotatable tool transfer means for transporting an old tool which has been removed from said spindle to an interchange position which is radially spaced from the spindle axis and is also spaced from said tool storage member, said tool transfer means having tool holding means consisting of means for holding one tool at a time with the tool axis parallel to the spindle axis, and said tool transfer means comprising an arm which is mounted at one end for rotation about an axis parallel to said spindle axis and which is provided with said tool holding means adjacent its opposite end, an exchanger member independent of said storage member and having a pair of spaced apart tool holding means adapted to hold a pair of tools simultaneously, each of said exchanger tool holding means comprising a socket parallel to the spindle axis and adapted to receive a shank portion of a tool for supporting the same, said exchanger being rotatable about an axis which is parallel to said spindle axis and intermediate said pair of sockets, said exchanger also being adapted to support in one of its sockets a newly selected tool which has been removed from said storage member and said exchanger being disposed at said interchange position so as to receive in the other of its sockets the old tool from said rotatable arm, and means for rotating said exchanger so as to move said old tool away from the tool holding means on said rotatable arm and deliver said new tool thereto whereby the newly selected tool may be transported to said spindle.

18. In automatic tool changing apparatus for use with a machine tool for transferring a newly selected tool from a tool storage member to a machine tool spindle and for removing an old tool from the spindle and returning it to the storage member, and wherein said tools are of the type having a shank portion and also a generally radial flange portion or the like with a flange gripping surface thereon, the improvement comprising, in combination, tool transfer means for transporting an old tool which has been removed from said spindle to an interchange position which is radially spaced from the spindle axis and is also spaced from said tool storage member, said tool transfer means having tool holding means consisting of gripping means for holding one tool at a time, said gripping means being adapted to engage a flange gripping surface on a tool and hold the same through gripping movement in a direction generally parallel to the axis of the tool, an exchanger member independent of said storage member and having a pair of spaced apart tool holding means adapted to hold a pair of tools simultaneously, each of said exchanger tool holding means comprising a socket parallel to the spindle axis and adapted to receive a shank portion of a tool for supporting the same, said exchanger being rotatable about an axis which is parallel to said spindle axis and intermediate said pair of sockets, said exchanger also being adapted to support in one of its sockets a newly selected tool which has been removed from said storage member and said exchanger being disposed at said interchange position so as to receive in the other of its sockets the old tool from said tool transfer means, and means for rotating said exchanger while said tool transfer means is disposed at said interchange position with said gripping means open so as to move said old tool away from said gripping means and deliver said new tool thereto whereby the newly selected tool may be transported to said spindle.

19. In automatic tool changing apparatus for use with a machine tool for transferring a newly selected tool from a tool storage member to a machine tool spindle and for removing an old tool from the spindle and returning it to the storage member, and wherein said tools are of the type having a shank portion and also a generally radial flange portion or the like with a flange gripping surface thereon, the improvement comprising, in combination, rotatable tool transfer means for transporting an old tool which has been removed from said spindle to an interchange position which is radially spaced from the spindle axis and is also spaced from said tool storage member, said tool transfer means having tool holding means consisting of gripping means for holding one tool at a time, said gripping means being adapted to engage a flange gripping surface on a tool and hold the same through gripping movement in a direction parallel to the axis of the tool, and said tool transfer means comprising an arm which is mounted at one end for rotation about an axis parallel to said spindle axis and which is provided with said gripping means adjacent its opposite end, an exchanger member independent of said storage member and having a pair of spaced apart tool holding means adapted to hold a pair of tools simultaneously, each of said exchanger tool holding means comprising a socket parallel to the spindle axis and adapted to receive a shank portion of a tool for supporting the same, said exchanger being rotatable about an axis which is parallel to said spindle axis and intermediate said pair of sockets, said exchanger also being adapted to support in one of its sockets a newly selected tool which has been removed from said storage member and said exchanger being disposed at said interchange position so as to receive in the other of its sockets the old tool from said rotatable arm, and means for rotating said exchanger while said rotatable arm is disposed at said interchange position with said gripping means open so as to move said old tool away from said gripping means and deliver said new tool thereto whereby the newly selected tool may be transported to said spindle.

20. In automatic tool changing apparatus for use with a machine tool for transferring a selected tool from a tool storage member to a machine tool spindle and for removing an old tool from the spindle and returning it to the storage member, and wherein said tools are of the type having a shank portion and also a generally radial flange portion or the like with a flange gripping surface thereon, the improvement comprising, in combination, rotatable tool transfer means for removing an old tool from said spindle and delivering the tool to an interchange position which is radially spaced from the spindle axis and is also spaced from said tool storage member, said tool transfer means having tool holding means consisting of gripping means for holding one tool at a time, said gripping means being adapted to engage a flange gripping surface on a tool and hold the same through gripping movement in a direction parallel to the axis of the tool, and said tool transfer means comprising an arm which is mounted at one end for rotation and axial movement relative to an axis parallel to said spindle axis and which is provided with said gripping means adjacent its opposite end, a horizontal shuttle movable forwardly and rearwardly along a path parallel to the axis of said spindle, an exchanger member independent of said storage member and having a pair of spaced apart tool holding means adapted to hold a pair of tools simultaneously, each of said exchanger tool holding means comprising a socket parallel to the spindle axis and adapted to receive a shank portion of a tool for supporting the same, said exchanger being rotatable about an axis which is parallel to said spindle axis and intermediate said pair of sockets, said exchanger also being adapted to support in one of its sockets a newly selected tool which has been removed from said storage member, and said exchanger being mounted on said shuttle for movement forwardly with said shuttle to said interchange position wherein it is adapted to receive in the other of its sockets the old tool from said rotatable arm, means for moving said arm axially forwardly to withdraw an old tool from said spindle and means for rotating said arm to transport said old tool to said interchange position, said arm being movable axially rearwardly to insert said old tool in said other of said sockets, and means for rotating said exchanger while said rotatable arm is disposed at said interchange position with said gripping means open so as to move said old tool away from said gripping means and deliver said new tool thereto whereby the newly selected tool may be transported to said spindle and inserted therein through further rotational and axial movement of said arm.

21. In automatic tool changing apparatus for use with a machine tool for transferring a selected tool from a tool storage member to a machine tool spindle and subsequently back again to the storage member, the improvement comprising, in combination, axial tool transport means movable axially to insert a tool in a machine tool spindle and to withdraw a tool therefrom, and tool transfer means having tool holding means thereon and adapted to receive from said axial transport means an old tool which has been removed from said spindle and to transport the same along a path lying in a plane perpendicular to the axis of said spindle to a position which is radially spaced from said spindle axis, said tool transfer means also being adapted for movement in said plane to deliver a newly selected tool to said axial transport means whereby through axial movement of the latter said new tool may be inserted in said spindle.

22. In automatic tool changing apparatus for use with a machine tool for transferring a selected tool from a tool storage member to a machine tool spindle and subsequently back again to the storage member, the improvement comprising, in combination, axial tool transport means movable axially to insert a tool in a machine tool spindle and to withdraw a tool therefrom, and tool transfer means comprising an arm rotatable about an axis parallel to the axis of said spindle and having tool holding means thereon, said arm being adapted to receive from said axial transport means an old tool which has been removed from said spindle and to transport the same along an arcuate path lying in a plane perpendicular to said spindle axis to a position which is radially spaced from said spindle axis, said arm also being adapted for rotational movement in said plane to deliver a newly selected tool to said axial transport means whereby through axial movement of the latter said new tool may be inserted in said spindle.

23. The invention of claim 22 wherein said axial transport means is housed within said machine tool spindle and is movable between a forward axial position wherein it projects forwardly of said spindle and a rearward axial position wherein it is substantially retracted within said spindle.

24. The invention of claim 23 wherein said axial transport means includes collet means for gripping the shank of a tool whereby when said axial transport means is in its rearward axial position said collet is adapted to hold a tool in operative position in said spindle for a machining operation and when said axial transport means is in its forward axial position said collet means is adapted to hold a tool in said forward position for transfer to said rotatable arm.

25. In automatic tool changing apparatus for use with a machine tool for transferring a newly selected tool from a tool storage member to a machine tool spindle and for removing an old tool from the spindle and returning it to the storage member, and wherein said tools are of the type having a shank portion and a generally radial flange portion or the like with a flange gripping surface thereon, the improvement comprising, in combination, axial transport means movable axially to insert a tool in a machine tool spindle and to withdraw a tool therefrom, said axial transport means being housed within said machine tool spindle and including collet means for gripping the shank of a tool whereby when said axial transport means is moved to a rearward axial position so as to be substantially retracted within said spindle said collet is adapted to hold a tool in operative position in said spindle for a machining operation and when said axial transport means is moved to a forward axial position so as to project forwardly of said spindle said collet is adapted to hold a tool in said forward position, and tool transfer means comprising an arm rotatable about an axis parallel to the axis of said spindle and having tool gripping means thereon, said gripping means being adapted to engage a flange gripping surface on a tool and hold the same with the tool axis parallel to said spindle axis through gripping movement in a direction parallel to the axis of the tool, and said arm being adapted to receive from said axial transport means an old tool which has been removed from said spindle and to transport the same along an arcuate path lying in a plane perpendicular to said spindle axis to a position which is radially spaced from said spindle axis, said arm also being adapted for rotational movement in said plane to deliver a newly selected tool to said axial transport means whereby through axial movement of said axial transport means said new tool may be inserted in said spindle.

26. In automatic tool changing apparatus for use with a machine tool for transferring a selected tool from a tool storage member to a machine tool spindle and subsequently back again to the storage member, the improvement comprising, in combination, axial tool transport means movable axially to insert a tool in a machine tool spindle and to withdraw a tool therefrom, tool transfer means for receiving from said axial transport means an old tool which has been removed from said spindle and for transporting the same along a path lying in a plane perpendicular to the axis of said spindle to an interchange position which is radially spaced from the spindle axis, said tool transfer means having tool holding means consisting of means for holding one tool at a time, and an exchanger member disposed at said interchange position and having a pair of tool holding means adapted to hold a pair of tools simultaneously, said exchanger being adapted to receive said old tool from said tool transfer means and deliver a newly selected tool to said tool transfer means whereby said newly selected tool may be transferred to said axial transport means for insertion in said spindle.

27. In automatic tool changing apparatus for use with a machine tool for transferring a selected tool from a tool storage member to a machine tool spindle and subsequently back again to the storage member, the improvement comprising, in combination, axial tool transport means movable axially to insert a tool in a machine tool spindle and to withdraw a tool therefrom, rotatable tool transfer means for receiving from said axial transport means an old tool which has been removed from said spindle and for transporting the same along a path lying in a plane perpendicular to the axis of said spindle to an interchange position which is radially spaced from the spindle axis, said tool transfer means having tool holding means consisting of means for holding one tool at a time, and said tool transfer means comprising an arm which is mounted at one end for rotation about an axis parallel to said spindle axis and which is provided with said tool holding means adjacent its opposite end, an exchanger member having a pair of spaced apart tool holding means adapted to hold a pair of tools simultaneously, said exchanger being rotatable about an axis which is parallel to said spindle axis and intermediate said pair of tool holding means, said exchanger also being adapted to support in one of its holding means a newly selected tool which has been removed from said storage member and said exchanger being disposed at said interchange position so as to receive in the other of its holding means the old tool from said rotatable arm, and means for rotating said exchanger so as to move said old tool away from the tool holding means on said rotatable arm and deliver asid new tool thereto whereby said newly selected tool may be transferred to said axial transport means for insertion in said spindle.

References Cited by the Examiner
UNITED STATES PATENTS

| 2,782,689 | 2/1957 | Carlsen | 29—26 |
| 3,052,011 | 9/1962 | Brainard | 29—26 |
| 3,099,873 | 8/1963 | Brainard | 29—26 |

RICHARD H. EANES, Jr., *Primary Examiner.*